Jan. 21, 1936.　　　　H. T. BOOTH　　　　2,028,188
VISCOSIMETER
Filed Feb. 7, 1933
Fig. 1.
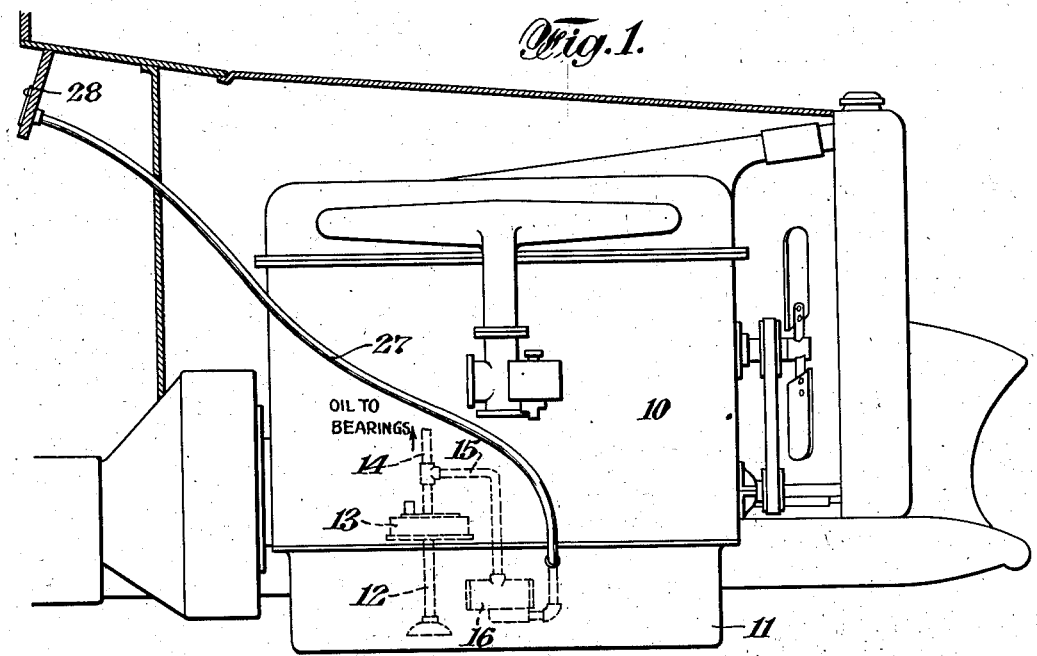
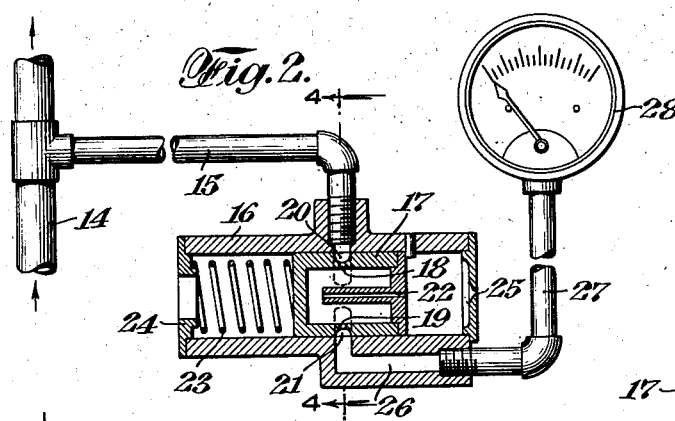
Fig. 2.
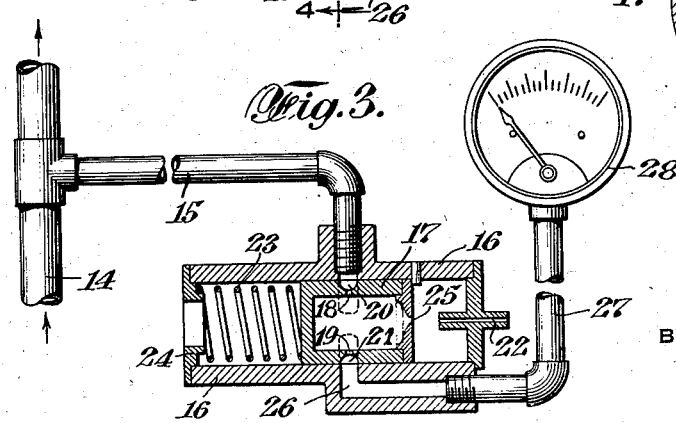
Fig. 3.
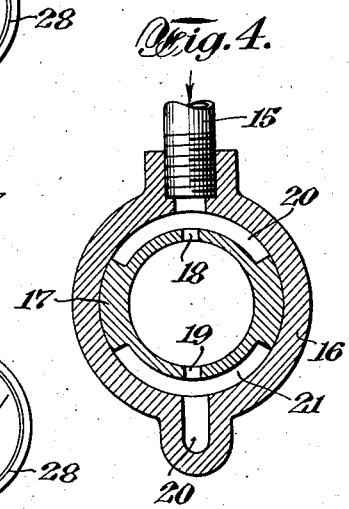
Fig. 4.
INVENTOR
Harry T. Booth
BY Kenyon & Kenyon
ATTORNEYS Patented Jan. 21, 1936

2,028,188

UNITED STATES PATENT OFFICE 2,028,188

VISCOSIMETER

Harry T. Booth, Detroit, Mich., assignor to Lubrication Control Corporation, Chicago, Ill., a corporation of Delaware Application February 7, 1933, Serial No. 655,580

11 Claims. (Cl. 265—11)

This invention relates to viscosimeters and has for an object a simple and efficient device for measuring and registering the viscosity of fluid flowing through the device.

In a viscosimeter embodying the invention, fluid is caused to pass successively through two ports, one port comprising a friction tube, the resistance of which to flow varies with the viscosity of the fluid and the other port comprising an orifice, the resistance of which to fluid flow is substantially independent of the fluid viscosity, these ports being arranged in either of two orders of succession. Means are provided for regulating the pressure of the fluid supplied to the first port to maintain constant pressure in the fluid between the two ports and the pressure of the fluid supplied to the inlet port is applied to a pressure actuated viscosity indicator. The pressure of the fluid supplied to the inlet port is a function of the viscosity of the fluid and the indicator is suitably calibrated to give direct viscosity readings.

Other objects, novel features and advantages of this invention will be apparent from the following specification and accompanying drawing, wherein:

Fig. 1 is a side elevation of an automobile engine having a lubricating system provided with a viscosimeter embodying the invention;

Figs. 2 and 3 are vertical central sectional views through a viscosimeter embodying the invention, and Fig. 4 is a section on the line 4—4 of Fig. 2.

The internal combustion engine 10 is provided with an oil pan 11 from the bottom portion of which a pipe 12 leads to the inlet port of a pump 13. A pipe 14 leads from the outlet port of the pump to the engine bearings (not shown). A pipe 15 leads from pipe 14 to a casing 16 arranged in the upper portion of the oil pan 11. A relief valve may be connected to the pipe 14 to prevent the oil pressure from exceeding a predetermined maximum.

A hollow piston 17 is slidably mounted in the casing 16 and is provided with radial ports 18 and 19 which communicate with peripheral grooves 20 and 21 in the outer surface of the piston (Fig. 4). The position of this piston with respect to the pipe 15 controls flow of oil through said pipe into the interior of the piston. The piston is provided with a friction tube 22 which extends through the right end wall of the piston. A spring 23 is interposed between the piston 17 and a hollow plug 24 mounted in the left end of the casing. An orifice 25 in the right hand end of the casing 16 provides for escape of oil from the space between the piston 17 and the right hand end of the casing. The rate of flow through the orifice and friction tube is the same. A conduit 26 has one end in communication with the groove 21 and has its other end in communication with the pipe 27 leading to a pressure actuated indicator 28 suitably calibrated to give direct viscosity readings.

The friction tube 22 is of such dimensions that its resistance to fluid flow varies with the fluid viscosity, while the orifice 25 is of such dimensions that its resistance to fluid flow is substantially independent of the fluid viscosity and, as will later be described, the pressure of the oil supplied to the friction tube is regulated to maintain substantially constant pressure in the oil between the friction tube 22 and orifice 25 independent of the pressure in the fluid flowing through the pipe 15. The resistance of the friction tube to fluid flow and the pressure differential across it vary conjointly with the fluid viscosity and as the fluid pressure between the friction tube and orifice is maintained constant, and the resistance to flow of the orifice is dependent on the rate of flow and is substantially independent of viscosity, and as the rate of flow through the friction tube and orifice is the same, the pressure of the oil supplied to the friction tube is a measure of the rate of flow through the friction tube and is a function of the oil viscosity. The indicator 28 registers the pressure of the supplied oil and as it is suitably calibrated it gives direct readings of the oil viscosity.

Substantially constant pressure is maintained in the oil between the friction tube and orifice by regulatory movement of the piston 17 against and under the influence of the spring 23. When the pressure in the space between the friction tube and orifice tends to exceed the strength of the spring 23, the piston 17 is moved to the left, thereby reducing the flow of oil into the piston with a corresponding pressure decrease. As the pressure tends to decrease below the strength of the spring, the piston is moved to the right, thus increasing the oil flow and such movement of the piston maintains substantially constant pressure of the oil between the friction tube and orifice. The pressure of the oil supplied to the friction tube is applied to the indicator 28 through the port 19, conduit 26 and pipe 27. In the event of a pressure increase in the pipe 15 without change of viscosity, the pressure in the piston 17 will tend to increase. Such pressure increase results in a pressure increase between the orifice and the friction tube which immediately causes movement of the piston 17 to the left thereby reducing the rate of flow into the piston until the ratio of flow into the piston and through the outlet port becomes such that the desired pressure is obtained between the orifice and friction tube. During such adjustment period, the gauge 24 may give a temporary erroneous reading, but such reading will be immediately corrected by reduction of flow into the piston 17 to maintain the predetermined frequency between the orifice and the friction tube.

The viscosimeter disclosed in Fig. 3 differs from the viscosimeter disclosed in Fig. 2 in that the piston 17 is provided in its right end wall with an orifice 25 and a friction tube 22 is provided for discharging oil from the space between the piston 17 and the right end of the casing 16. The pressure of the oil in the space between the piston 17 and the right end of the casing 16 is maintained substantially constant by the regulatory action of the piston 17.

As the resistance of the friction tube 22 to fluid flow varies with the fluid viscosity and as the fluid pressure between the orifice and the friction tube is maintained substantially constant, the rate of flow through the friction tube varies with viscosity. As the resistance to flow of the orifice is substantially independent of viscosity and is dependent upon rate of flow and as the rate of flow through the orifice is the same as through the friction tube, the pressure of the oil supplied to the friction tube is a measure of the rate of flow and is a function of the oil viscosity. The pressure of the supplied oil is applied to the viscosity indicator 28 as previously described, thus making available direct viscosity readings. In the modification disclosed in Fig. 2 an increase of pressure within the piston 17 is indicative of increase of viscosity, while in the modification disclosed in Fig. 3 an increase in pressure within the piston 17 is indicative of decrease of viscosity and the reverse is true for both these modifications.

It is of course understood that various modifications may be made in the device above described without in any way departing from the spirit of the invention as defined in the appended claims.

I claim:

1. In a viscosimeter having in series a port comprising a friction tube and a second port comprising an orifice, means for supplying fluid under pressure to one port, means for regulating the pressure of the supplied fluid to maintain constant pressure between said ports, and a viscosity indicator responsive to the fluid pressure immediately in advance of said first port.

2. In a viscosimeter, a chamber having an inlet port comprising a friction tube and an outlet port comprising an orifice, means for supplying fluid under pressure to said inlet port, means for regulating the pressure of the supplied fluid to maintain constant pressure within said chamber, and a viscosity indicator responsive to the fluid pressure immediately in advance of said first port.

3. In a viscosimeter having in series a port comprising a friction tube and a second port comprising an orifice, means for supplying fluid under pressure to said friction tube, means for regulating the pressure of the supplied fluid to maintain constant pressure between said ports, and a viscosity indicator responsive to the fluid pressure immediately in advance of said first port.

4. In a viscosimeter, a chamber having an inlet port comprising an orifice and an outlet port comprising a friction tube, means for supplying fluid under pressure to said inlet port, means for regulating the pressure of the supplied fluid to maintain constant pressure within said chamber, and a viscosity indicator responsive to the fluid pressure immediately in advance of said first port.

5. In a viscosimeter having in series ports comprising an orifice and a friction tube, means for supplying fluid under pressure to said orifice, means for regulating the pressure of the supplied fluid to maintain constant pressure between said ports, and a viscosity indicator responsive to the fluid pressure immediately in advance of said orifice.

6. In a viscosimeter, a casing, a hollow piston mounted in said casing, a spring opposing movement of the piston in one direction, said casing and hollow piston having cooperating ports to control fluid flow into the piston, a friction tube extending through the end of said hollow piston, said casing having an outlet orifice, and a pressure actuated viscosity indicator connecting with the interior of said piston.

7. In a viscosimeter, a casing, a hollow piston mounted in said casing, a spring opposing movement of the piston in one direction, said casing and hollow piston having cooperating ports to control fluid flow into the piston, said hollow piston having an orifice in one end, a friction tube outlet from said casing, and a pressure actuated viscosity indicator communicating with the interior of said piston.

8. In a viscosimeter, a casing, a hollow piston mounted in said casing, a spring opposing movement of the piston in one direction, said casing and hollow piston having cooperating ports to control flow into the piston, said hollow piston having an inlet port in one end for flowing fluid into said casing, said casing having an outlet port, and a pressure actuated viscosity indicator connected with the interior of said piston, one of said two last-named ports comprising an orifice and the other comprising a friction tube.

9. In a device of the character described, a chamber having inlet and outlet ports, one of said ports comprising a friction tube and the other port comprising an orifice, a source of fluid under pressure, means for supplying fluid from said source to the inlet port of said chamber, means responsive solely to the pressure within said chamber for controlling flow from said source to the inlet port of said chamber to maintain constant pressure within said chamber, and pressure responsive means acted upon by fluid pressure immediately in advance of said first port.

10. In a device of the character described, a chamber having an inlet port comprising a friction tube and an outlet port comprising an orifice, a source of fluid under pressure, means for supplying fluid from said source to said inlet port, means responsive solely to the pressure within said chamber for controlling flow from said source to said inlet port to maintain constant pressure within said chamber, and pressure responsive means acted upon by the supplied fluid immediately in advance of said inlet port.

11. In a device of the character described, a chamber having an inlet port comprising an orifice and an outlet port comprising a friction tube, a source of fluid under pressure, means for supplying fluid from said source to said orifice, means responsive solely to the pressure within said chamber for controlling flow from said source to said orifice to maintain constant pressure within said chamber, and pressure responsive means acted upon by fluid pressure immediately in advance of said orifice.

HARRY T. BOOTH.